United States Patent [19]

Abrahamson

[11] 4,178,122
[45] Dec. 11, 1979

[54] METHOD AND APPARATUS FOR CUBING BRICK

[76] Inventor: Daniel P. Abrahamson, 3030 N. 56th Dr., Phoenix, Ariz. 85031

[21] Appl. No.: 891,321

[22] Filed: Mar. 29, 1978

[51] Int. Cl.² .......................................... B65G 57/08
[52] U.S. Cl. ................................ 414/110; 53/540; 198/409; 198/419; 414/786
[58] Field of Search .............. 214/1 BB, 6 P, 152, 214/6 C, 6 A; 198/409, 412, 419; 53/537, 540

[56] References Cited

U.S. PATENT DOCUMENTS

| | | | |
|---|---|---|---|
| 2,966,018 | 12/1960 | Currie | 53/74 |
| 2,974,812 | 3/1961 | Bopp | 214/6 |
| 3,070,240 | 12/1962 | Barriol | 214/6 |
| 3,095,678 | 7/1963 | Cliff | 53/124 |
| 3,096,891 | 7/1963 | Verrinder | 214/6 |
| 3,392,851 | 7/1968 | Pearne | 214/6 |
| 3,398,675 | 8/1968 | Potter | 100/7 |
| 3,404,788 | 10/1968 | Thomas | 214/6 |
| 3,428,192 | 2/1969 | Witmer | 214/8.5 |
| 3,480,161 | 11/1969 | Bason | 214/6 |
| 3,487,954 | 1/1970 | Pearne | 214/6 |
| 3,729,084 | 4/1973 | Stuart | 198/21 |
| 3,731,785 | 5/1973 | Stuart | 198/35 |
| 3,738,514 | 6/1973 | Jones | 214/152 |
| 3,788,495 | 1/1974 | Fachini | 214/6 B |
| 3,834,298 | 9/1974 | Paschal | 100/7 |
| 3,892,318 | 7/1975 | Berndt | 214/6 A |
| 3,904,043 | 9/1975 | Jones | 214/6 A |
| 3,917,081 | 11/1975 | Pearne | 214/6 A |
| 3,919,372 | 11/1975 | Vogele | 264/82 |
| 3,942,651 | 3/1976 | Neely | 214/6 B |
| 3,958,506 | 5/1976 | Salts | 100/4 |
| 4,013,183 | 3/1977 | Milholen | 214/152 |

Primary Examiner—Albert J. Makay
Assistant Examiner—George F. Abraham
Attorney, Agent, or Firm—Luedeka & Hodges

[57] ABSTRACT

A method and apparatus for receiving brick standing on their ends with their length dimension oriented uprightly, accumulating the brick in a cradle oriented in a horizontal plane, reorienting the cradle with its load of brick, ejecting the brick from the cradle as a stack unit to a transfer station, and transferring the reoriented stack of brick on to a pallet or other receiver therefor.

9 Claims, 13 Drawing Figures

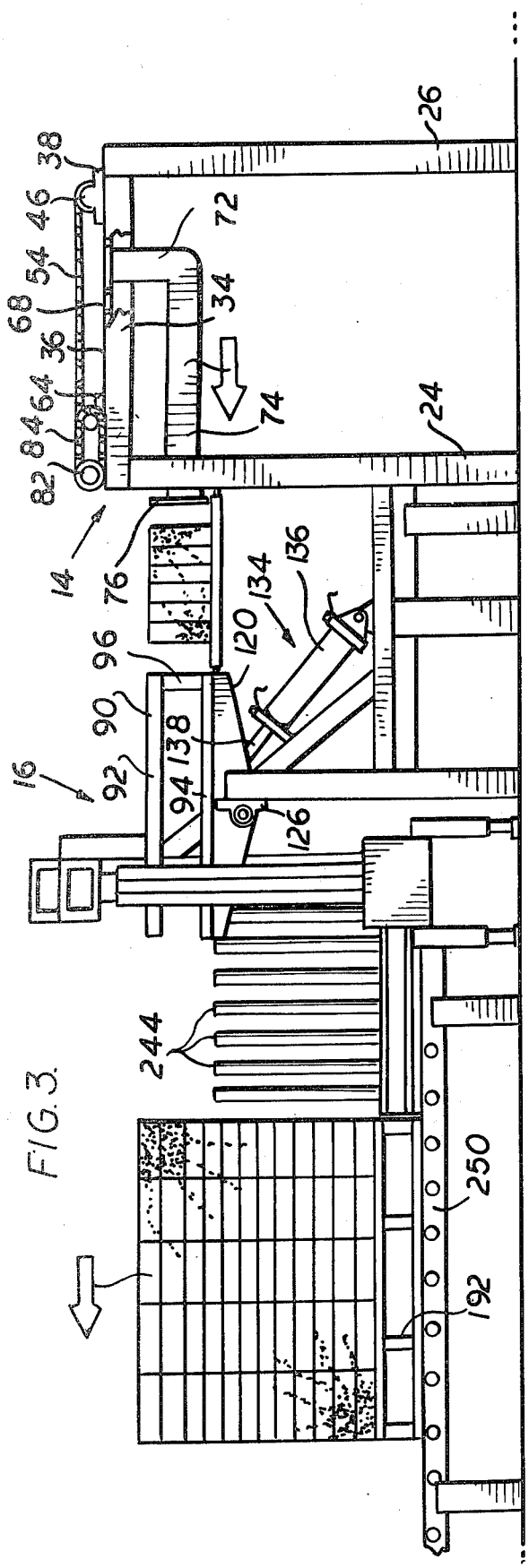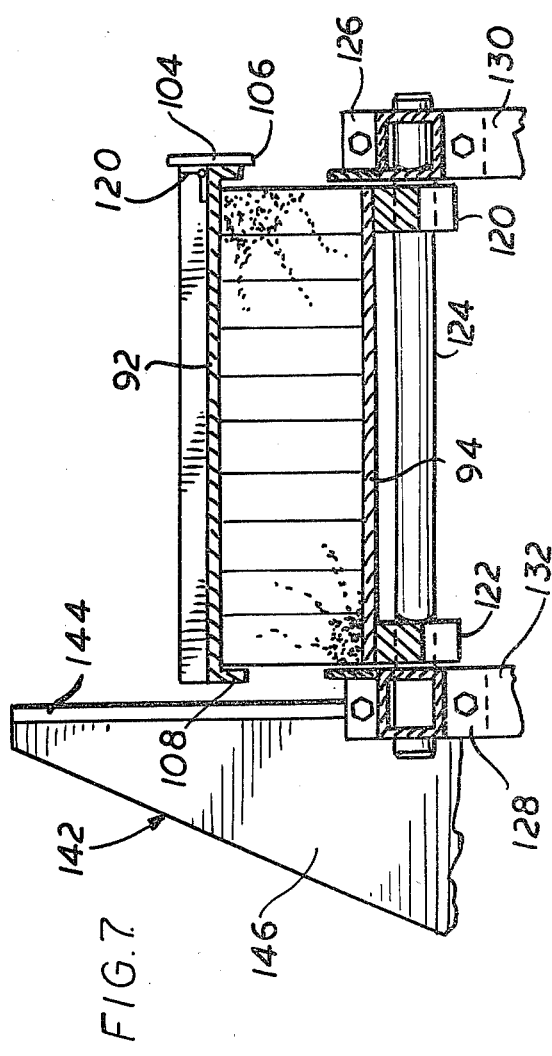

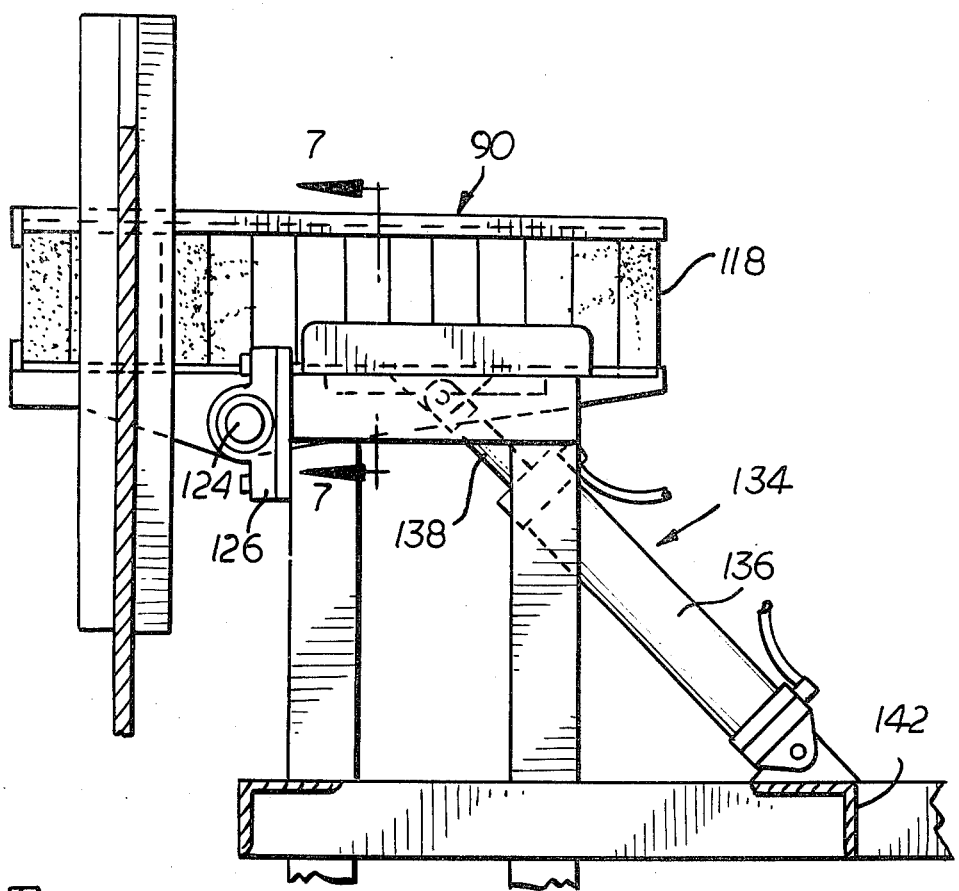
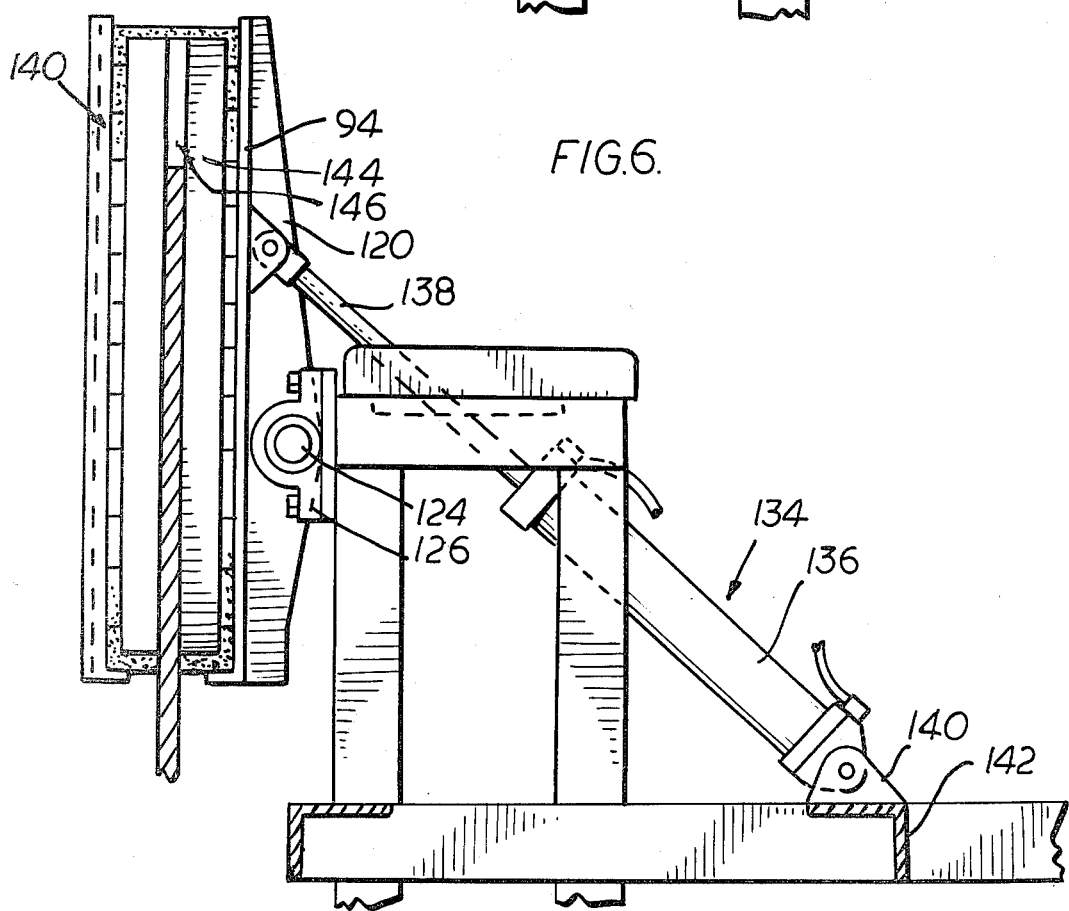

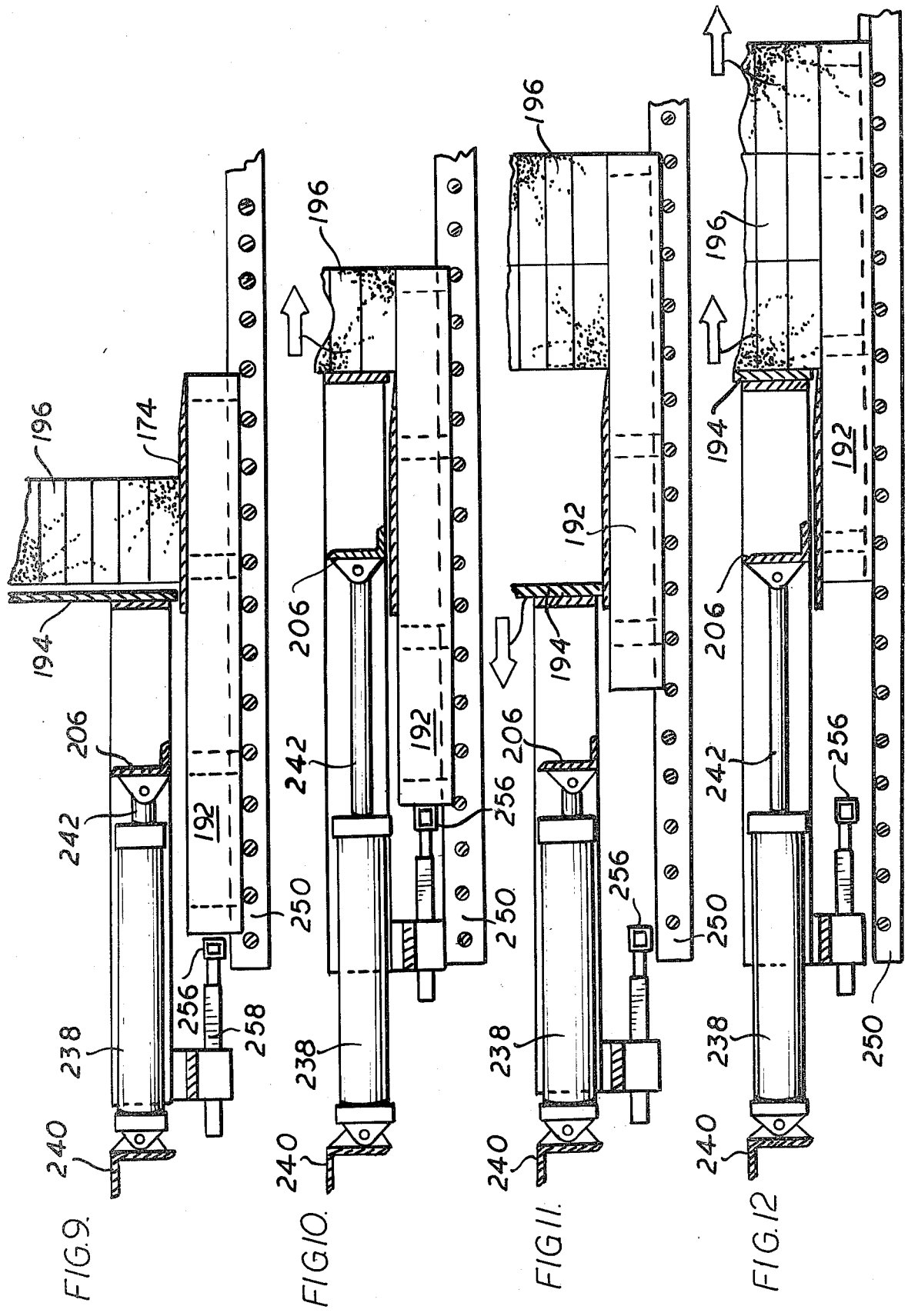

METHOD AND APPARATUS FOR CUBING BRICK

This invention relates to systems for accumulating and stacking brick in a cube.

Brick commonly are fabricated by molding techniques. Masonry, i.e. cement, brick commonly are about two and five-eighths inches wide, by three inches thick, by seven and five-eighths inches long. Each brick has a flat end and is slightly tapered along its length dimension as required for successful ejection from the mold. Upon their ejection from the mold, the brick are received on their flat ends on a pallet with their length dimensions oriented uprightly. It is desired that the bricks be accumulated in an orderly arrangement, i.e., cubed, for storage and/or transfer. Heretofore, this cubing operation has been performed manually or employing apparatus which is less than satisfactory as regards its reliability of operation and/or its capability of being fully automated.

It is an object of the present invention to provide an improved method for accumulating and arranging a plurality of individual brick in an orderly arrangement suitable for storage and/or transport thereof. It is another object to provide an improved apparatus for cubing brick. Other objects and advantages of the invention will be recognized from the following description, including the claims and drawings in which:

FIG. 3 is a front elevational view of the apparatus depicted in FIG. 1 as taken along line 3—3 of FIG. 1;

FIG. 5 is a side elevational view taken along line 5—5 of FIG. 2, and showing the cradle means of the disclosed apparatus in its horizontal position;

FIG. 6 is a side elevational view showing the cradle means in its vertical position;

FIG. 7 is a sectional view taken along the line 7—7 of FIG. 5;

FIGS. 9-12 are fragmentary, sectional views taken along line 9—9 of FIG. 8 and showing sequentially the functioning of the transfer apparatus disclosed herein.

Figure 1:
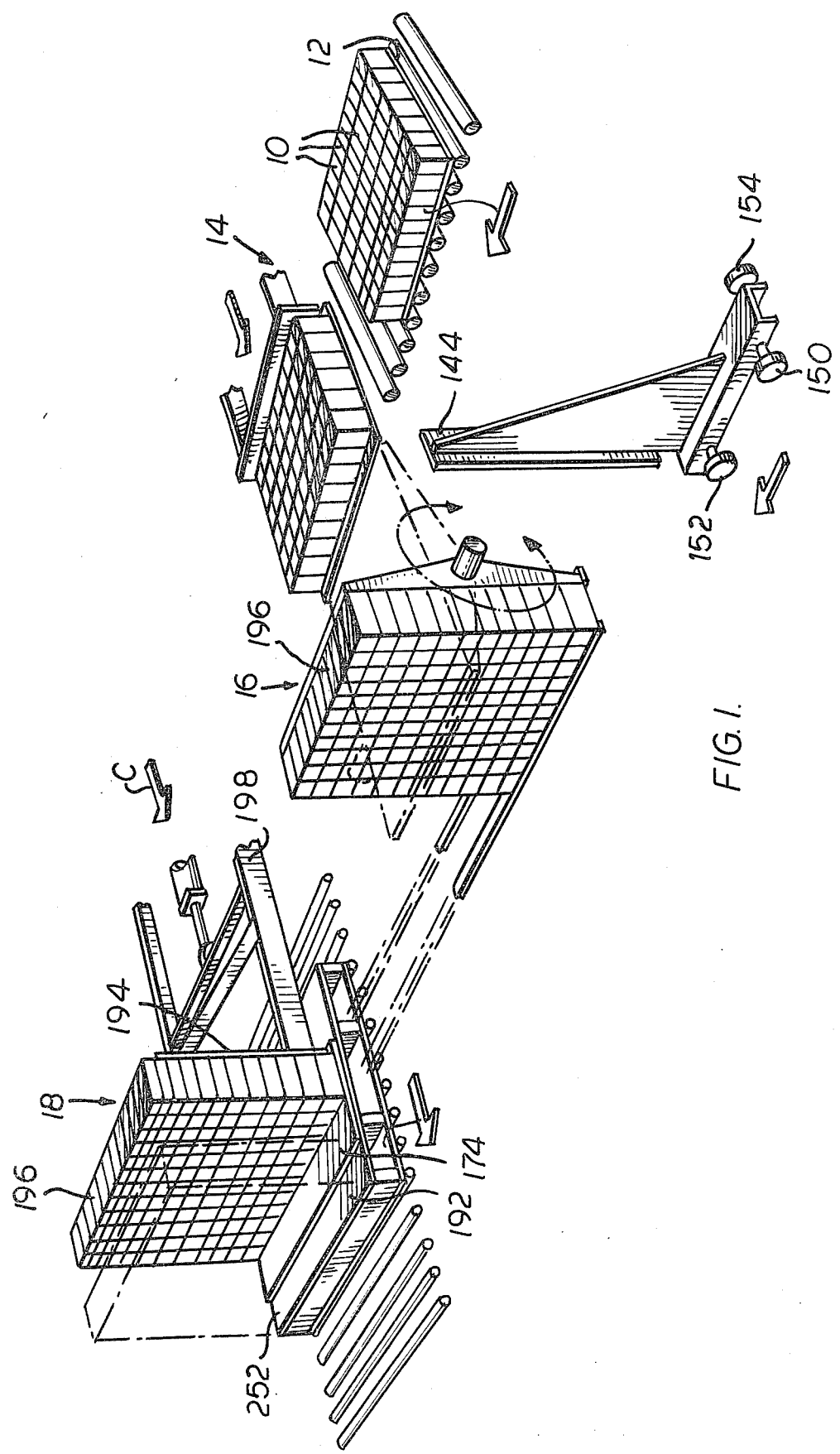
FIG. 1 is a fragmentary representation of apparatus embodying various features of the invention.

Stated briefly, the present system receives brick from a source such as a brick molding machine and/or a kiln, such brick usually being transported to the present apparatus in groups on individual pallets that travel on a conventional conveyor. In accordance with the disclosed system, individual brick are received while standing on their flat end (i.e., with their length dimension oriented uprightly), and while so oriented are loaded into a cradle which is itself oriented in a horizontal plane. Individual brick are close packed in the cradle with their respective length dimensions oriented upright. When the cradle is filled with the desired quantity of brick, the cradle is tilted to a vertical position, thereby positioning the brick with their longitudinal dimensions oriented horizontally and with their flat ends oriented generally in a common plane to define a stack of such brick. Pusher means ejects the stack of brick from the cradle as a unit to a transfer station. Thereafter the cradle is returned to its horizontal position for receiving a further load of brick and the pusher means returns to its "home" position. Within the transfer station, a further pusher, comprising an upright plate, is caused to engage the flat ends of the brick on one side of the stack simultaneously to move the stack of brick out of the transfer station in a direction perpendicularly to the common plane occupied by the flat ends of the bricks to move the stack on to a pallet or the like.

With reference to the Figures, in accordance with the present disclosure, a plurality of brick 10 are received from a kiln or the like (not shown). In the depicted embodiment, the brick are received while standing on their respective flat ends on a pallet 12. Within the present apparatus, these brick are accumulated and stacked in a cube. In the depicted embodiment, the apparatus of the present invention includes an in-feed station 14, a reorientation station 16, and a transfer station 18. These several stations are defined, among other things, by a plurality of frame members organized into a skeletal framework.

Figure 2:
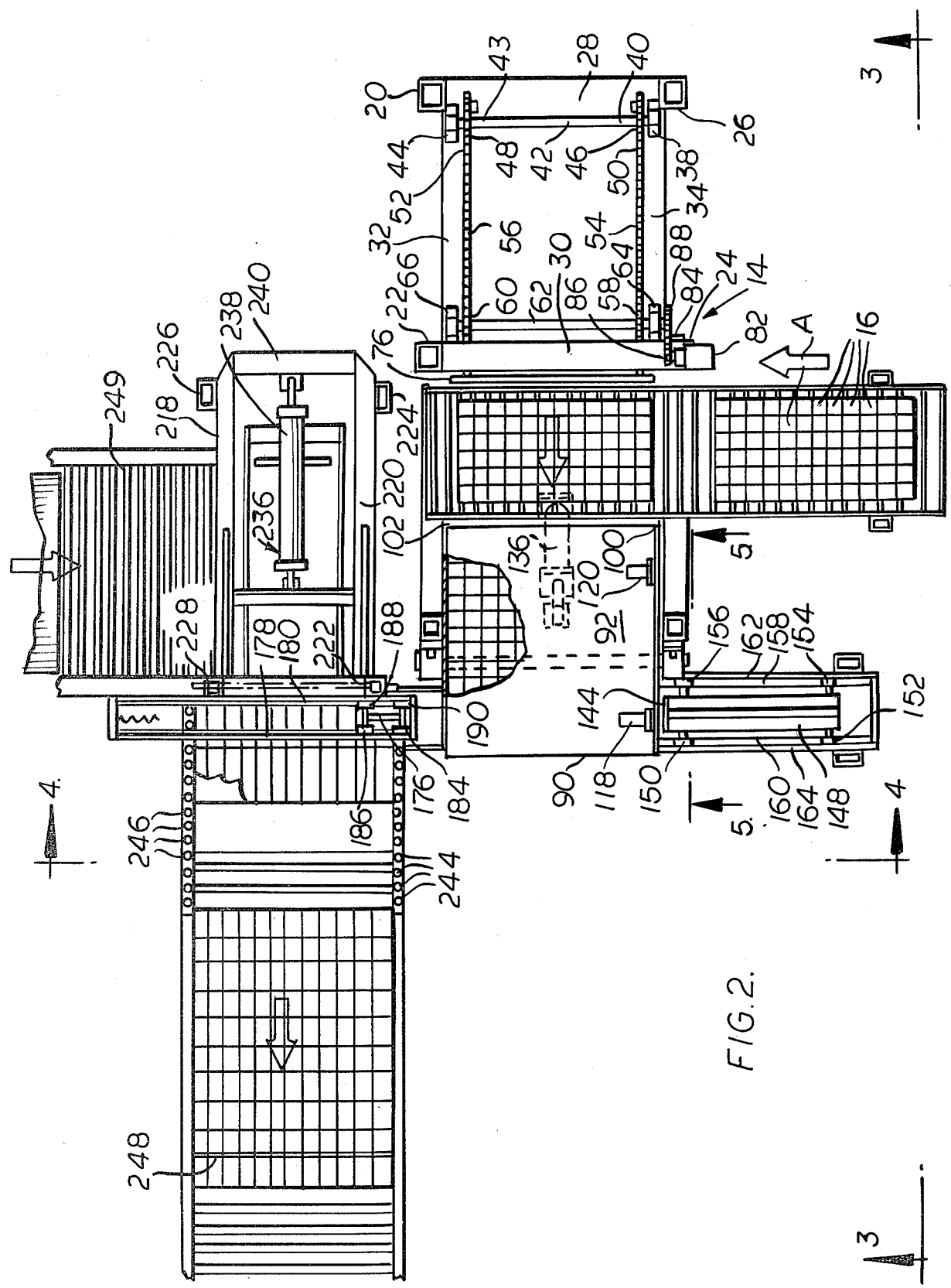
FIG. 2 is a plan view of apparatus embodying various features of the invention.
Figure 4:
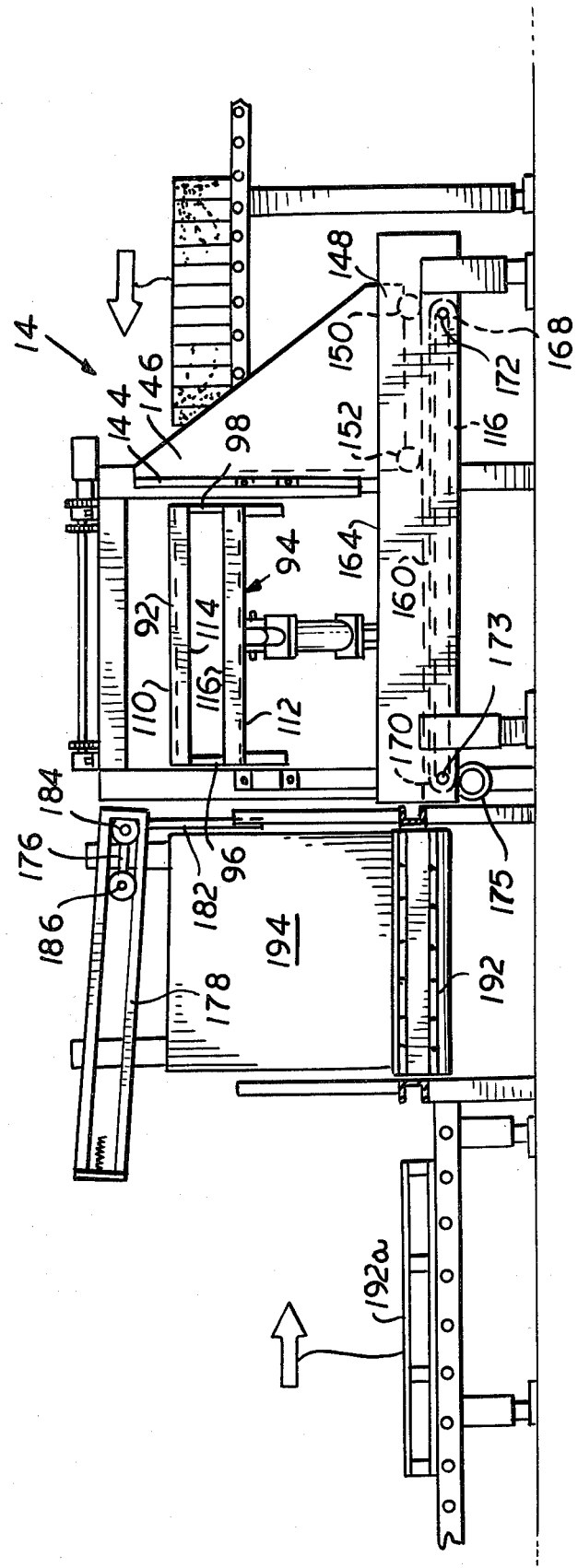
FIG. 4 is a front elevational view of the apparatus depicted in FIG. 1 as taken along line 4—4 of FIG. 2.

More specifically, with reference to FIGS. 2 and 3, at the in-feed station 14, there is provided a plurality of upright posts 20, 22, 24, and 26 which are interconnected as by cross members 28 and 30 at their upper ends. The lower ends of the posts rest upon a supporting surface and at their upper ends provide support for a generally rectangular framework comprising a first stringer 32 secured to the posts 20 and 22 and a second stringer 34 secured to the posts 24 and 26. These stringers are connected one to another at their ends as by cross members 28 and 30, thereby defining an "open" framework. On the upper edge 36 of the stringer 34, there is provided a pillow block 38 within which there is journaled one end 40 of a shaft 42 which extends from the stringer 34 transversely across the framework to the opposite stringer 32 where the opposite end 43 of the shaft 42 is similarly journaled in a pillow block 44 mounted on the top edge of the stringer 32. Within the space defined by the stringers, and adjacent the end 40 of the shaft 42, there is provided a sprocket 46 and a further sprocket 48 at the opposite end 43 of the shaft. Chains 50 and 52 are trained about the sprockets 46 and 48, respectively, and extend therefrom in upper runs 54 and 56 to engage and wrap a second set of sprockets 58 and 60 fixed on the ends of a shaft 62 which has its opposite ends journaled in a set of pillow blocks 64 and 66 also mounted on the top edges of the first and second stringers 34 and 32, respectively, at a location adjacent the inboard end of the stringers. After the chains wrap the sprockets 58 and 60, they extend in second runs 68 and 70 (run 70 not shown) to the sprockets 46 and 48 to form a continuous loop.

Interposed within the second runs 68 and 70 of the chains 50 and 52 there is provided a pair of depending arms (only arm 72 is visible) which are movable in a reciprocating motion between the outboard and inboard ends of the stringers upon activation of the chains 50 and 52. At the lower ends of each of the arms 72, there is provided a horizontal leg 74. To the outboard ends of these legs 74 there is mounted a generally vertically oriented, elongated planar depalleter plate 76. It will be noted that the depalleter plate 76 is oriented with its length dimension generally parallel to the movement of the brick (Arrow A) into the infeed station 14. Accordingly, upon activation of the chains 50 and 52, the depalleter plate engages a quantity of the incoming brick 16 on a pallet to push the brick from the pallet into a cradle 90.

Movement of the chains 50 and 52 is affected by means of a motor 82, preferably hydraulically driven, connected to the shaft 62 as through a chain 84 and sprockets 86 and 88. The hydraulic motor 82 is of the type which is reversible in operation such that the chains 50 and 52 may be driven in either a forward or rearward direction, as desired, thereby providing for reciprocatory movement of the depallater plate 76.

The reorientation station 16 of the present apparatus comprises a generally skeletal rectangular cradle 90, which includes first and second planar side plates 92 and 94 that are oriented in generally parallel relationship one to another and spaced apart from one another as by means of frame members 96, and 98, disposed at the corners 100 and 102 of the plates 92 and 94. As desired, the distance between the plate 92 and 94 may be made adjustable to accommodate different length brick. The plate 92 is provided at one of its side edges 104 with a strip which defines a lip 106 that projects from the plate 92 in a direction toward the opposite side plate 94. The opposite edge of the plate 92 is provided with a similar lip 108 which also projects therefrom in the direction of the side plate 94. Notably, the lips 106 and 108 extend only a relatively short distance from their respective edges so that there is substantial open space between the lips and the opposing side plate 94. In similar manner, the side edges of the side plate 94 can be provided with lips if desired. Still further, the bottom edges 110 and 112 of the side plates 92 and 94 are provided with lips 114 and 116. The lip 106 is mounted on the plate 92 as by spring leaf hinges 118 and 120 such that the lip 106 is movable from its orientation generally perpendicular to the side plate 92 to an orientation wherein the lip is in a plane generally parallel to the side plate 92 thereby providing for a full opening between the side plates 92 and 94 for purposes as will appear more fully hereinafter. Preferably, the lip 106 is spring loaded toward its "closed", that is, perpendicular orientation with respect to the side plate 92. Referring to FIG. 5, the entrance 118 of the cradle 90 is unobstructed. Brick with their length dimension oriented uprightly are pushed off the pallet 12 by the depalleter plate 76 through the mouth of the cradle, thence into the interior of the cradle until the brick come to rest against the lips 114 and 116 at the bottom of the cradle. It will be noted that the lips provided about the edges of the cradle, with the exception of the mouth portion, prevent the brick from sliding out of the cradle while establishing substantial unobstructed open space between the side edges of the plates 92 and 94.

Referring to FIGS. 3 and 7, the side plate 94 of the cradle is further mounted on rocker members 120 and 122 which, in turn, are mounted on a shaft 124 whose opposite ends are journaled in pillow blocks 126 and 128 that are mounted on legs 130 and 132. In this manner, the cradle is mounted for rotation about the axis of the shaft 124 to change the cradle from a horizontal orientation to a vertical orientation. In the depicted embodiment, such reorientation of the cradle is affected by means of a hydraulically operated piston-cylinder device 134 including a cylinder 136 and a piston rod 138. One end of the cylinder 136 is pivotally anchored as by a clevis 140 to a cross frame member 142. The outboard end of the piston 138 is pivotally mounted to the outer surface 144 of the plate 94, as by a clevis 146, such that extension of the rod 138 from the cylinder 136 functions to rotate the cradle about the axis of the shaft 124. In the reverse operation, retraction of the rod 138 within the cylinder 136 acts to return the cradle to a horizontal orientation. In a preferred embodiment, the piston-cylinder device 134 is of the double acting type.

It is to be noted that reorientation of the cradle 90 from the horizontal results in reorientation of the longitudinal dimension of the brick within the cradle from an upright to a horizontal position. It is further noted that the construction of the cradle is such that when the cradle is in its vertical position, there are no cross members extending between the side plates 92 and 94 at locations other than the top of the cradle. Accordingly, the rear side 140, as viewed in FIG. 6, of the cradle is "open" as is the bottom of the cradle.

For extracting the accumulated brick from the cradle in a stack unit, in the depicted embodiment there is provided an elongated upright pusher 142 comprising an elongated planar plate 144 and having width dimensions less than the opening between the plates 92 and 94 of the cradle. This pusher plate is mounted in an upright orientation and in alignment between the side plates of the cradle, such that this pusher plate can be caused to pass substantially through the cradle. As depicted, the pusher plate 144 is mounted on a gusset member 146 whose bottom end is secured on a carrige 148. This carriage is provided with a plurality of wheels 150, 152, 154, and 156, which ride on a set of rails 158 and 160 that are in turn mounted on frame members 162 and 164 such that the carriage 148 is rollably mounted for movement in a direction that will move the pusher plate 144 through the vertically oriented cradle 90 to eject the brick from the cradle. It will be recalled at this point, that the lip 106 of the cradle is hinged to be urged open to allow the brick to move out of the cradle under the influence of the pusher plate. Movement of the carriage 148 is accomplished by means of a chain 166 which is trained about sprocket members 168 and 170 rotatably mounted to the frame member 164 by means of shafts 172 and 173. Movement of the chain 166, hence the carriage 148 in a reciprocating movement along the rails 158 and 160 is by a means of a hydraulic motor 175 of the reversible operation type connected to the shaft 174 as by a suitable sprocket and chain arrangement.

As the brick are moved from the cradle 90, they are received in a transfer station indicated generally by the numeral 18. In the transfer station there is provided a platform 174 on to which the brick are slidably received. Because of the generally nonuniform shape of the brick, the stack of brick pushed from the conveyor is relatively unsteady, particularly as regards the brick in the upper layers. To stabilize the stack of brick as it is being pushed from the cradle there is provided a yieldable restraint comprising a trolley 176 mounted on a set of rails 178 and 180 that are aligned with the direction of travel of the stack and inclined in a direction urging the trolley by gravity toward the stack of brick. From the trolley there depends an arm 182 which is in position to engage the leading edge of the stack of brick being pushed from the cradle. Through the selection of the weight of the trolley and/or the degree of friction applied against the rotation of the wheels 184, 186, 188, and 190 of the trolley, there is provided a degree of resistance against the forwardly moving stack of brick sufficient to maintain the arm 182 in contact with at least the several upper layers of the stack to prevent these brick from tipping during the movement of the brick from the cradle.

Figure 8:
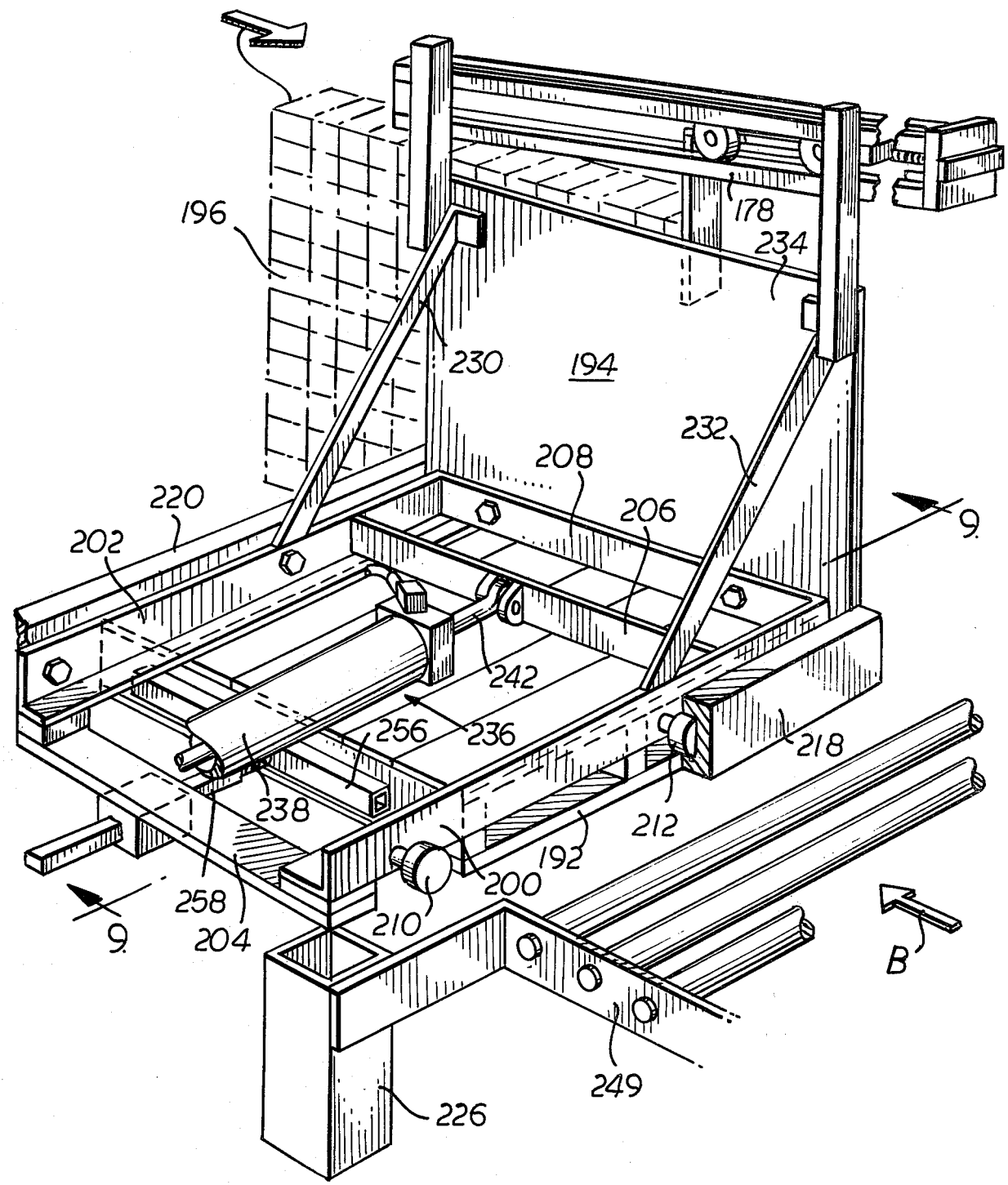
FIG. 8 is a representation of apparatus comprising the transfer station of the disclosure.
Figure 13:
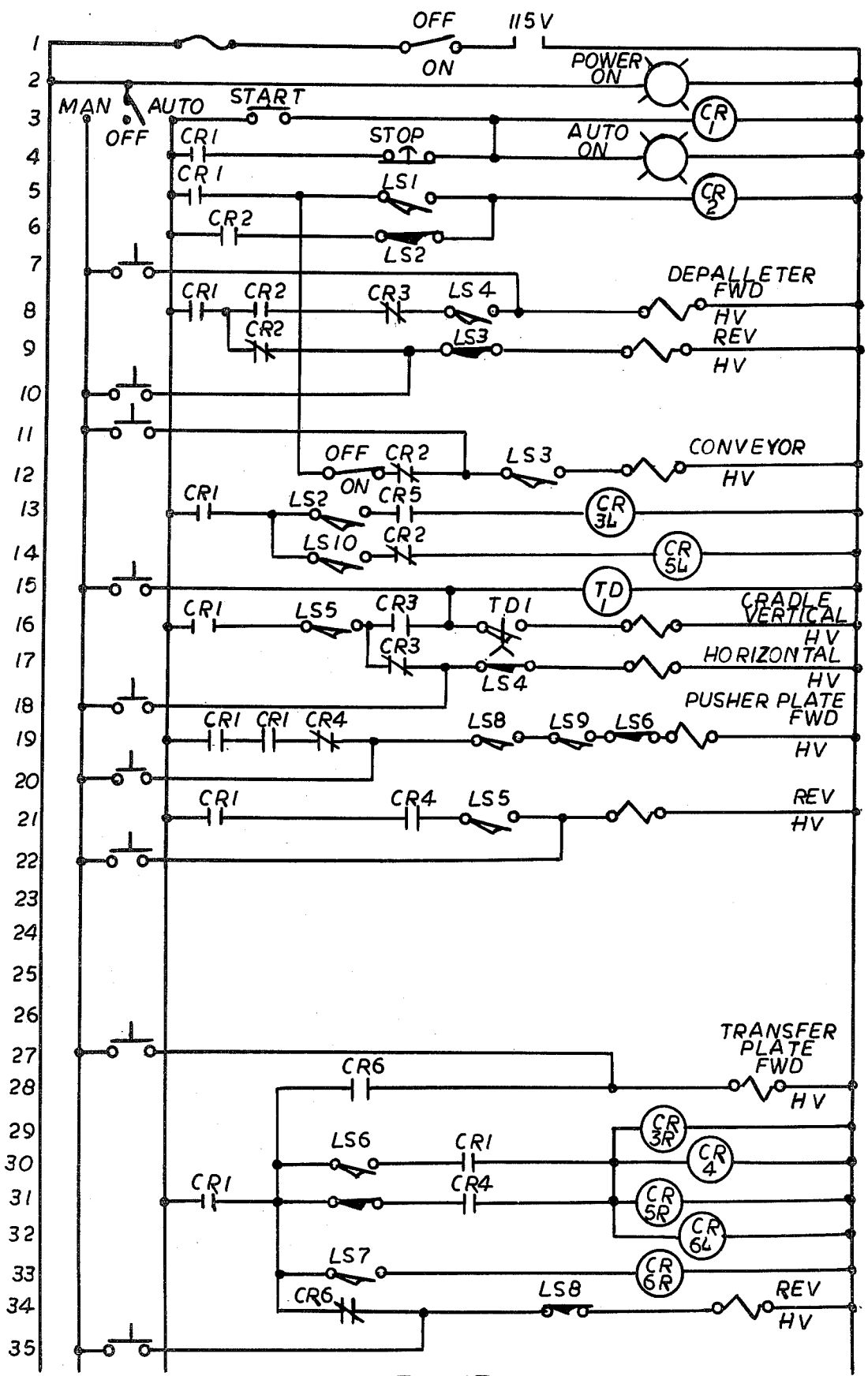
FIG. 13 is a diagrammatic representation of a control system for the disclosed apparatus.

In the transfer station 18, it is desired to move the stack of brick as a unit on to a pallet 192 or the like. In the depicted embodiment, this is accomplished by means of a transfer plate 194 having width and height dimensions substantially equal to the width and height dimensions of the stack 196 of brick. This transfer plate is oriented in a generally vertical plane that is generally parallel to the common plane occupied by the flat ends of the brick in the stack 196. Referring to FIGS. 1 and 8, this transfer plate 194 is mounted on a trolley 198 comprising side members 200 and 202 that are maintained in generally parallel relationship one to another as by cross members 204, 206 and 208. The side members are provided with wheels 210, 212, 214 and 216 (wheels 214 and 212 are not visible in the Figures), which in turn are mounted on rails 218 and 220 extending along opposite sides of the trolley 198. These rails 218 and 220 are in turn supported by posts 222, 224, 226 and 228. Braces 230 and 232 extending from the trolley 198 to the upper edge 234 of the plate 194 provide further rigidity to the transfer plate 194. Reciprocatory movement of the trolley 198, hence reciprocatory movement of the transfer plate 194 for pushing the brick from the transfer station on to the pallet 192 is accomplished by a double acting piston-cylinder device 236. One end of the cylinder 238 of this device is pivotaly anchored to a cross member 240 extending between the rails 218 and 220. The outboard end of the piston-rod 242 of the device is pivotally secured to the cross member 206 on the trolley such that extension of the rod 242 moves the trolley, hence the transfer plate 194 to slide the brick from the transfer station on to the pallet 192. Retraction of the rod within the cylinder 238 returns the transfer plate to its position for further cycling.

Within the transfer station, there is provided a plurality of sets of upright rollers 244 and 246 against which the leading and trailing edges of the stack of brick bear as the brick are moved out of the transfer station in a direction generally perpendicular to the direction which the brick followed when being moved into the transfer station. In this manner, the stack of brick is stabilized as the stack is moved from the transfer station to the pallet.

As desired, while in the transfer station or immediately after the exit of the stack of brick from the transfer station, the stack may be provided with a band 248 to stabilize the stack during subsequent movement thereof.

In a preferred embodiment of the apparatus, there is provided an in-feed roller conveyor 249 along which a pallet is fed (See Arrow B FIG. 8) to a position adjacent the transfer station 18. From the conveyor 249, the pallet is transferred to a further roller conveyor 250 disposed beneath the transfer station. The pallet 192 on the conveyor 250 is moved from under the transfer station to receive on its leading edge 252 (FIG. 1 a first stack of brick. Thereafter, subsequent stacks of brick pushed on to the pallet engage the previous stack of brick to push the pallet and previous stack of brick forwardly as the subsequent stack of brick is pushed out of the transfer station.

The initial movement of the pallet 192 from its position under the transfer station to a location where its leading edge 252 is exposed for receiving a stack of brick is accomplished by means of a pusher bar 256 which is mounted by an arm 258 on the cross member 204 and which projects toward the pallet 192 (See FIG. 8). Thus, as the trolley 198 moves forwardly (Arrow C of FIG. 1), the pusher bar 256 contacts the pallet to move the pallet forwardly simultaneously with the plate 194 pushing the stack 196 of brick out of the transfer station.

In a preferred mode of operation of the present apparatus, each of the functioning elements thereof is automatically controlled. With pallets of brick on the conveyor from the kiln, etc. ready to be moved to the infeed station, and a pallet in position on the conveyor under the transfer station, referring to FIG. 18, the control system is switched to "AUTO". This action energizes relay CR1 at locations 4, 5, 8, 13, 16, 19, 21, 30 and 31, energizing these circuit portions. When CR1 at location 5 is energized, and the "ON-OFF" switch at location is "ON", the hydraulic solenoid at line 12 is activated to commence movement of the infeed conveyor to feed pallets of brick from the kiln to the infeed station. As the brick on a pallet enter the infeed station the brick contact limit switch, LS1 (location 5) to close LS1. This action closes CR2 at locations 6 and 8 and simultaneously opens CR2 at locations 9 and 12. Opening the relay CR2 at location 9 removes power from the hydraulic valve shown in location 9 whose function is to return the depalleter plate 76 to its "home" (reverse) position. Also simultaneously, activation of CR2 at location 8 activates the hydraulic solenoid (HV) at location 8 to commence forward movement of the depalleter plate 76 to push a first load of brick from the pallet into the cradle 90. When this first load of brick is fully inserted into the cradle, the depalleter plate 76 contacts limit switch LS2. This action opens LS2, at position 6 and closes LS2 at position 13 causing relay CR2 at locations 6 and 8 to return to the open mode and relay CR2 at locations 9 and 12 to return the closed mode. This action activates the hydraulic solenoid at location 9 to return the depalleter plate 76 to its reverse or "home" position. This action also reactivates the infeed conveyor (position 12) to move a second pallet of brick into the infeed station. When the brick on this second pallet contacts limit switch LS1, the cycle for depalletizing the brick and loading the same into the cradle is repeated.

It will be noted that when LS2 is opened at position 6 by reason of the depalleter plate 76 reaching its forward limit of travel into the cradle 90 with the first load of brick, the contacts of LS2 at location 13 are closed. However, because CR5 (location 13) is open, relay latch CR3l at location 13 is not activated. When the first load of brick is loaded into the cradle, the depalleter also contacts LS10 (location 14) to activate CR5L (location 14) to latch in CR5 at location 13. When the second load of brick is loaded into the cradle and the depalleter again contacts LS2, this time CR5 (location 13) is energized so that CR3L is activated to latch in CR3 at location 8 in the open mode thereby preventing further forward movement of the depalleter until CR3 is subsequently released. As this point in time, when the depalleter plate returns to its reverse limit of travel and contacts LS3 to open LS3 at position 9, the reverse movement of the depalleter plate 76 is halted and no further cycling of the depalleter can occur unitl CR3 and CR5 are released.

At the forward limit of travel of the depalleter plate 76 with the second batch of brick, when the plate 76 contacts LS2, among other things, this action closes CR3 at location 16, opens CR3 at location 17 and closes CR3 at location 19. These actions cut off power to the hydraulic solenoid at location 18 which serves to bring about rotation of the cradle, to its horizontal position, and energizes the time relay TD1 at location 16. After TD1 times out, the hydraulic solenoid at location 16 is activated to tilt the cradle 90 to its vertical position. When in its vertical position, the cradle contacts limit switch LS4. This closes LS4 at location 17, placing the hydraulic solenoid at location 17 in condition for activation and deactivates the circuit which provides for forward movement of the depalleter plate 76.

When the cradle reaches its full down position, it also contacts LS9 at location 19. It is noted at this point that LS5 at location 16 is open when the pusher plate 144 is in its "home" or reverse position, LS8 at location 19 is closed when the transfer plate 194 is in its "home" or reverse position, and LS6 at location 19 is open when the pusher plate 144 is in its home position. Therefore, when LS9 is closed by the cradle 90, the hydraulic solenoid at location 19 is activated to move the pusher plate 144 forward to expel the stack of brick from the cradle.

When the pusher plate 144 reaches its forward limit of travel, it contacts LS6 at location 19 to open LS6 (location 19) and stop the forward movement of the pusher plate 144. This action also closes LS6 at location 30 to activate CR3R (location 29) and release CR3 to return to its "normal" mode, release CR4 at location 31 to activate CR5R at location 31 and release CR5, and to activate CR6L at location 33 to latch in CR6 at location 34 in its "open" mode. When CR4 is released, the hydraulic solenoid at location 21 is activated to move the pusher plate 144 to its home position where it contacts LS5 to close the same.

The signal from LS6 also energizes CR6 at location 28 to energize the hydraulic solenoid at location 28 to move the transfer plate 194 forward to move the stack of brick out of the transfer station on to a pallet. When the transfer plate 194 reaches its forward limit of travel, it contacts LS7 (location 33) to release CR6 (location 34) and reverse the travel of the plate 194. When the transfer plate 194 reaches its reverse position, it contacts LS8 and stops. Subsequent stacks of bricks are accumulated and moved on to the pallet through recycling of the apparatus.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. In a method for cubing elongated brick which have a flat end, and which are standing on their flat ends with their respective length dimensions oriented uprightly, the steps comprising simultaneously introducing a plurality of said brick into a cradle means in a close-packed relationship with their respective length dimensions generally parallel to one another and oriented uprightly, aligning one flat end of each of said brick in a horizontal plane in said cradle such that said flat ends of said brick occupy a common plane, tilting said cradle means to reorient the length dimension of said brick to a substantially horizontal position, ejecting said reoriented brick from said cradle as a stack unit and in a direction of movement generally parallel to the common plane occupied by said flat ends of said brick, applying a yieldable restraint against at least the upper ones of said brick in the leading edge of said stack as said stack is moved out of said cradle, positioning a pallet under said ejected stack of brick, substantially simultaneously contacting said flat ends of the bricks in said ejected stack and applying a force thereagainst which is sufficient to change the direction of movement of said stack of brick by about ninety degrees, and moving said stack of brick on to said pallet.

2. The method of claim 1 including the step of coordinating the movement of said pallet under said stack of brick with the movement of said stack in the last mentioned direction.

3. Apparatus for cubing substantially rectangular brick having individual flat ends and which initially are standing on their flat ends with their length dimension oriented uprightly comprising cradle means open at one end and dimensioned to receive therein said brick, said cradle including a planar side member oriented in a generally horizontal plane, means simultaneously moving a plurality of said brick into said cradle through said open end thereof and close packing said brick on said planar side member with said flat ends of said brick resting on said side member and with the respective length dimensions of said brick being oriented uprightly, means mounting said cradle for rotation between substantially horizontal and substantially vertical positions of said planar side member, means rotating said cradle means selectively between said horizontal and vertical positions, ejection means for contacting said brick in said cradle when said cradle is in its vertical position and ejecting the same therefrom as a stack unit in a direction of movement that is generally parallel to the plane occupied by said flat ends of said brick, and means for contacting generally simultaneously said flat ends of said brick in said stack to move said stack in a direction generally perpendicular to said plane occupied by said flat ends of said brick.

4. The apparatus of claim 3 including means yieldably contacting at least the upper ones of said brick in the leading edge of said stack as said stack is ejected from said cradle means.

5. The apparatus of claim 4 wherein said means contacting said upper bricks comprises a set of tracks aligned with the direction of movement of said stack of brick from said cradle and inclined toward said stack, carriage means rollably mounted on said tracks, and arm means depending from said carriage means in the path of movement of said stack from said cradle.

6. The apparatus of claim 3 including control means selectively and automatically effecting the functioning of said apparatus.

7. The apparatus of claim 3 wherein said cradle means comprises first and further planar side members, means positioning said side members in substantially parallel and spaced apart relationship one to another 8. The apparatus of claim 7 including means defining lip means along selected portions of the perimeters of each of said side members.

9. The apparatus of claim 3 including carriage means mounting said ejection means for reciprocatory movement with respect to said cradle means.

* * * * *